Nov. 4, 1930.                    C. RASMUSSEN                    1,780,439
                              METAL SAWING MACHINE
                      Filed Oct. 4, 1926         3 Sheets-Sheet 2
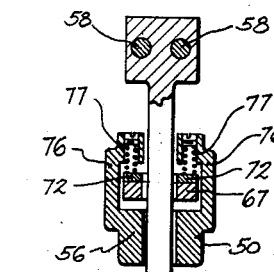
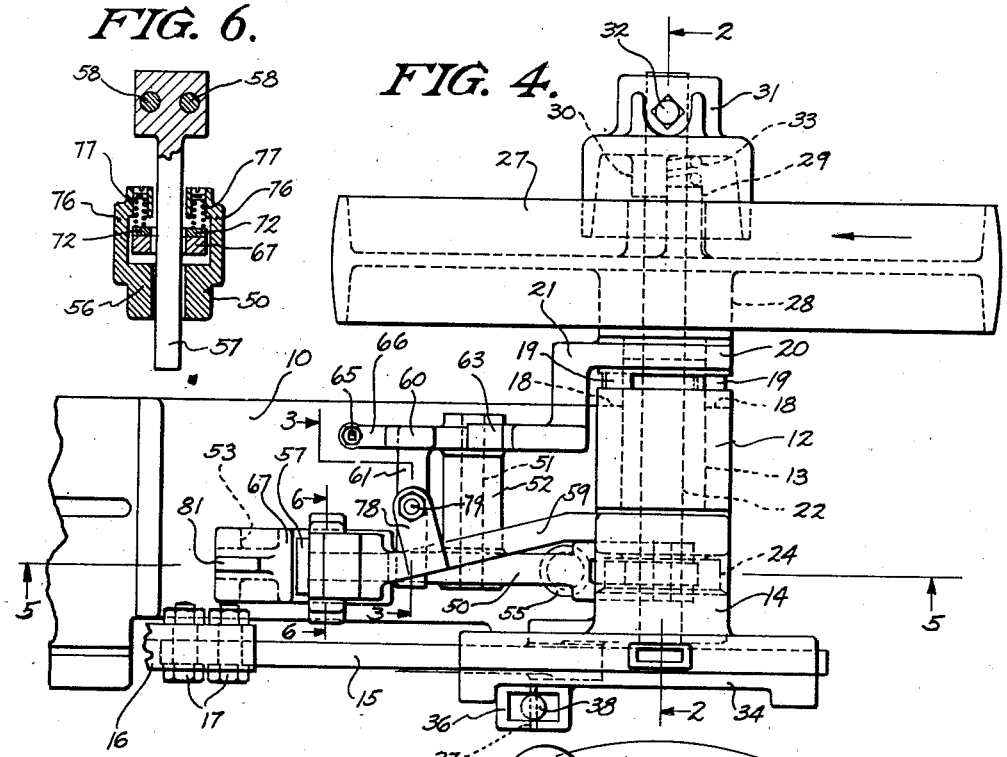
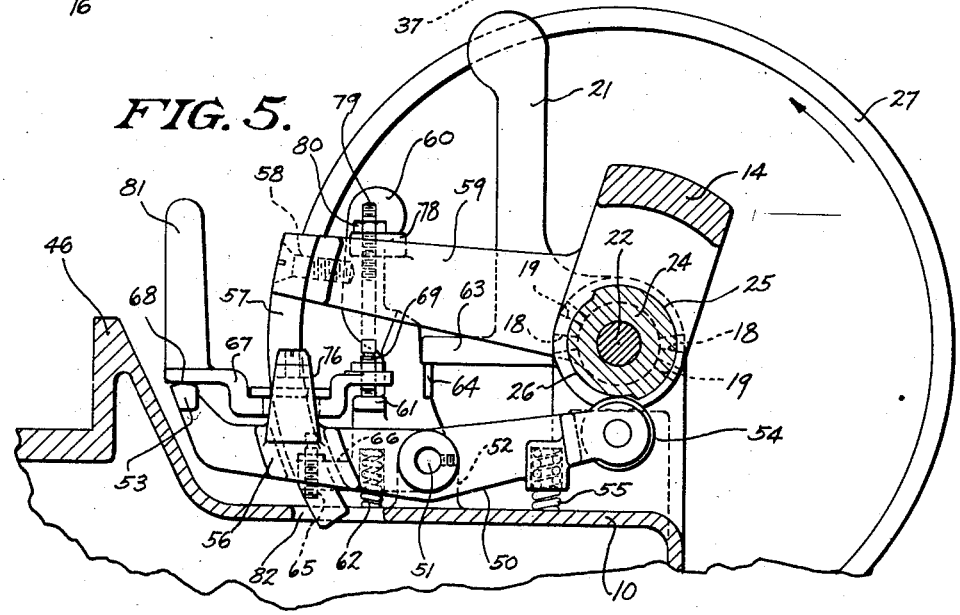

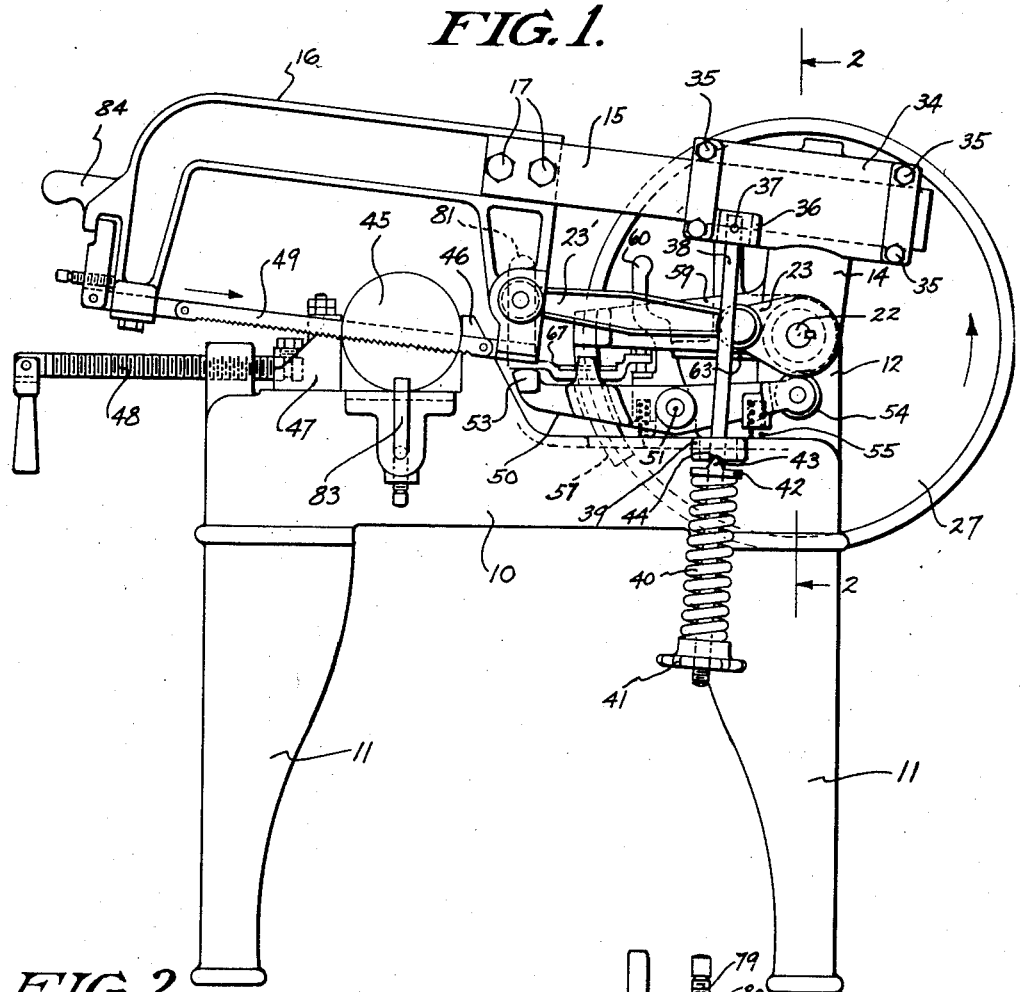
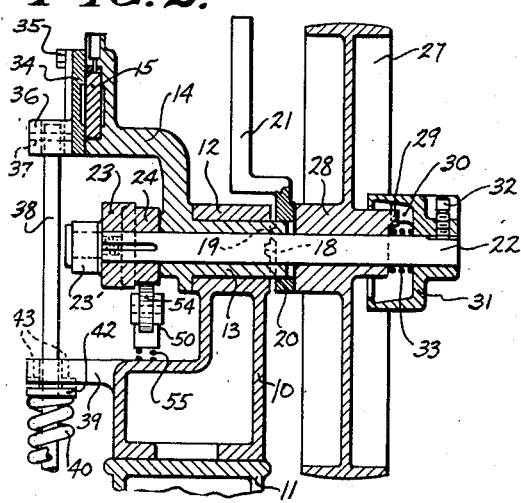
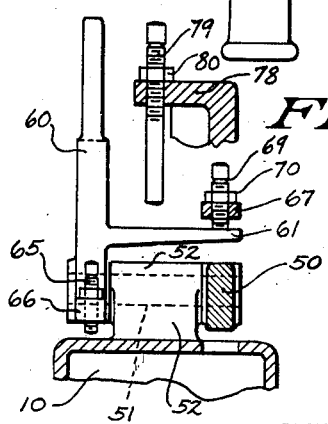

Nov. 4, 1930.   C. RASMUSSEN   1,780,439
METAL SAWING MACHINE
Filed Oct. 4, 1926   3 Sheets-Sheet 3

INVENTOR
Charles Rasmussen
BY
ATTORNEYS

Patented Nov. 4, 1930

1,780,439

UNITED STATES PATENT OFFICE

CHARLES RASMUSSEN, OF RACINE, WISCONSIN, ASSIGNOR OF ONE-HALF TO RALPH T. INGALLS, OF RACINE, WISCONSIN

METAL-SAWING MACHINE

Application filed October 4, 1926. Serial No. 139,309.

This invention relates to improvements in metal sawing machines, and more particularly to the mechanism or means for controlling feeding movement of the saw frame with respect to the work.

One of the objects of the present invention is to provide, in a machine of the character referred to, improved mechanism operable upon completion of the cutting stroke of the saw frame to raise the latter and the saw carried thereby a predetermined amount, and operable upon completion of the non-cutting stroke to let the saw frame down to permit feeding movement of the saw into the work.

Another object is to provide, in a machine of the character referred to, improved mechanism for raising the saw frame upon completion of the cutting stroke thereof and for lowering the saw frame into operating position upon completion of the non-cutting stroke, and wherein such mechanism operates automatically to prevent further feeding movement of the saw frame when the saw has cut through the work.

Another object is to provide, in a machine of the character referred to, improved means for holding or supporting the saw frame in raised position to permit placement of the work in the machine, and wherein such means may be readily operated to release the saw frame and permit movement thereof into operating position.

Another object is to provide, in a machine of the character referred to, improved mechanism operable when the saw has cut through the work to prevent further feeding movement of the saw, and wherein means are provided to automatically disconnect the saw frame from the driving means therefor in the event that said mechanism fails to function properly.

Another object is to provide, in a machine of the character referred to, improved mechanism for controlling feeding movement of the saw frame with respect to the work, and wherein such mechanism is simple in construction and manner of operation and may be made at a relatively small cost.

Other objects and advantages will hereinafter appear.

For the purpose of illustrating the invention one embodiment thereof is shown in the drawings, in which Figure 1 is a side elevational view, showing the saw frame in position about to begin its cutting stroke;

Fig. 2 is an enlarged sectional view, the section being taken on the line 2—2 in Fig. 1;

Fig. 3 is an enlarged fragmentary sectional view, the section being taken on the line 3—3 in Fig. 4;

Fig. 4 is an enlarged plan view of the right half of Fig. 1;

Fig. 5 is an enlarged elevational view, partly in section, the section being taken on the line 5—5 in Fig. 4;

Fig. 6 is an enlarged sectional view, the section being taken on the line 6—6 in Fig. 4;

Figure 7:
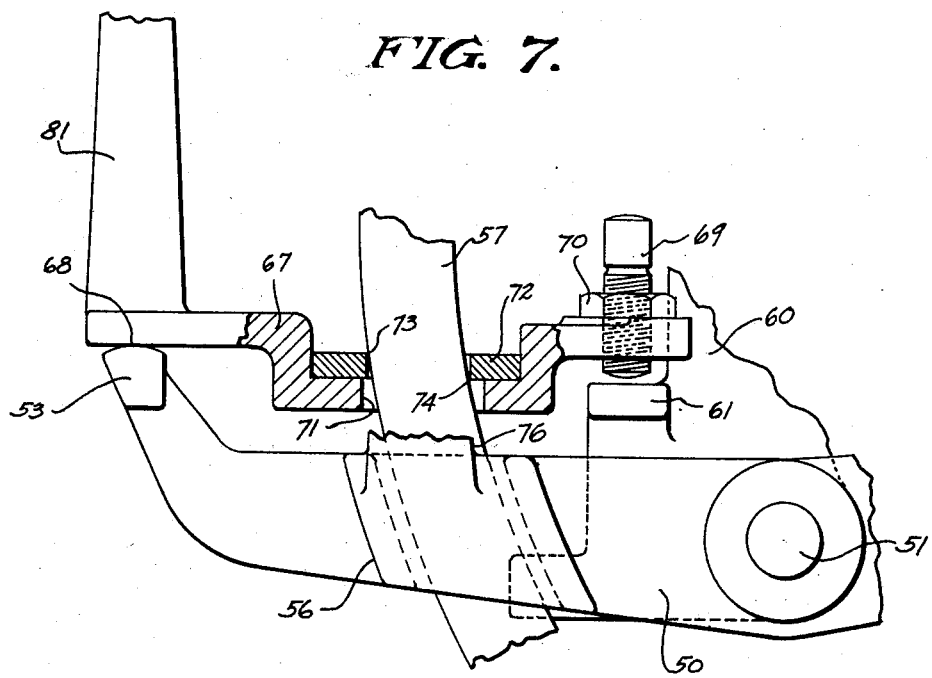
Figure 8:
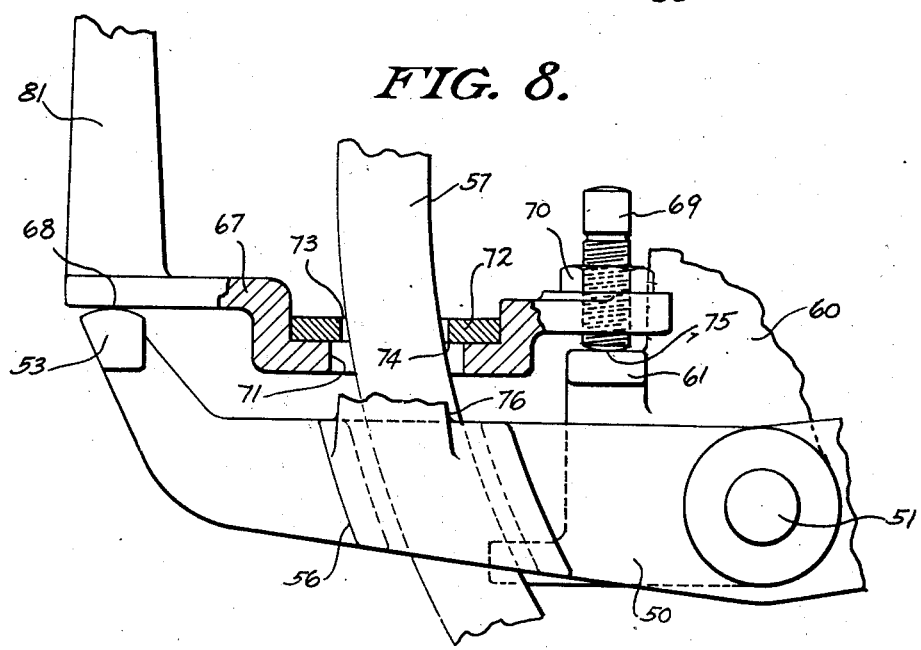

Fig. 7 is an enlarged view, partly in section and partly broken away, of the improved mechanism for controlling feeding movement of the saw frame, the parts comprising such mechanism being shown in their respective relative positions to hold the saw frame up out of operative position with respect to the work; and Fig. 8 is a view similar to Fig. 7, the parts comprising the improved controlling mechanism, however, being shown in their respective relative positions to release the saw frame and permit feeding movement thereof.

The base 10 of the machine may be mounted on suitable legs 11, as shown, and is provided at one end with the bearing 12 which loosely receives the cylindrical hub 13 which may be formed integrally with the crosshead 14 having its upper end recessed, as more clearly shown in Fig. 2, to slidably receive the bar 15 fixed rigidly at one end to the saw frame 16 by bolts 17. The bearing 12 is provided in its right hand end with diametrically opposite recesses 18 arranged to receive similarly arranged lugs 19 with which the hub 20 of the clutch actuating lever 21 is provided.

Sawing movement is imparted to the saw frame upon rotation, in the direction of the arrows in Figs. 1, 4 and 5, of the drive shaft 22 extending loosely through the hub 13 and being provided at one end with the crank 100

23 keyed to the shaft and connected to frame 16 by pitman or connecting rod 23'. A cam 24, which may be formed integrally with crank 23, is provided, as more clearly shown in Fig. 5, with the high portion 25 and the low portion 26 for the purpose hereinafter explained.

The shaft 22 is driven by the pulley 27 connected to some suitable source of power (not shown), and which is provided with the hub 28 loosely mounted on shaft 22 and provided with the laterally extending lug 29 arranged to engage the lug 30 formed integrally with the recessed collar 31 fixed on the adjacent end of shaft 22 by the set screw 32. The pulley 27 is thereby connected to shaft 22 through engagement of lug 29 with lug 30. A spring 33 is disposed within collar 31 and held compressed between the same and the adjacent end of hub 28 to at all times urge pulley 27 axially along shaft 22 to the left, as viewed in Fig. 2, such movement of the pulley being prevented, however, by the hub 20 interposed between the pulley hub 28 and bearing 12. Upon pivotal movement of lever 21 to the position thereof shown in Fig. 5, it will be seen that the lugs 19 will be placed in registration with recesses 18 and will be received by the latter to permit axial movement of lever 21 and pulley 27 along shaft 22 under the action of spring 33 to move lug 29 out of driving relation with lug 30, whereby the operating shaft 22 is disconnected from the source of power.

The plate 34 is secured by bolts 35 over the upper recessed end of crosshead 14 to hold bar 15 in operating relation with respect to the latter while permitting of free sliding movement of the bar through the crosshead upon rotation of shaft 22. The plate 34 is provided with the laterally extending lug 36 to which is connected, by the pin 37, the upper end of the rod 38 which extends downwardly and passes loosely through the lug 39 which may be cast integrally with base 10. A relatively stiff spring 40 is arranged on rod 38 and held compressed between an adjusting nut 41 threaded on the lower end of the latter and the washer 42 loosely disposed on the rod, the washer being provided with the upstanding diametrically arranged lugs 43 which are received by similarly arranged recesses 44 in the under side of lug 39 to allow for a certain amount of pivotal movement of the rod at the point of engagement of lugs 43 with recesses 44 upon vertical pivotal movement of the saw frame about the axis of shaft 22. It will thus be seen that the spring 40 and its associated parts urge the saw frame 16 downward at all times toward the work 45 which may be held in position by the usual clamping means comprising the fixed jaw 46 and the movable jaw 47 actuated by the screw 48.

The improved mechanism for controlling feeding movement of the saw frame and the saw 49 carried thereby includes the lever 50 fixed on one end of a pin 51 journaled in a bearing 52 with which the base 10 of the machine is provided, the lever being provided at one end thereof with the T-shaped head 53 and at its other end with a suitable roller 54 engaging cam 24 and being held in engagement with the latter by the spring 55 held compressed between this end of the lever and the machine base 10. Lever 50 is provided intermediate its head 53 and pin 51 with the enlarged portion 56 through which loosely passes the curved arm 57 supported and arranged in concentric relation with the axis of shaft 22 and fixed at its upper end by the screws 58 to the outer end of an arm 59 which may be formed integrally with crosshead 14. A lever 60 fixed on the other end of pin 51 and provided with the laterally extending horizontally disposed part 61, is urged at all times about the axis of pin 51 as a center in a clockwise direction, as viewed in Fig. 5, by the spring 62 held compressed between this lever and the base 10 of the machine, such movement of lever 60 under the action of spring 62 being limited by engagement with the lever of the lug 63 formed integrally with the clutch actuating lever 21 and which seats on a steel insert 64 with which lever 60 may be provided. In this connection it is to be noted that with the parts in their normal operating positions, as shown in Figs. 2 and 5, with the driving pulley 27 connected to shaft 22, as explained, rotation of the pulley in the direction indicated by the arrows will tend to cause pivotal movement of lever 21 in this direction due to the frictional engagement of the pulley hub 28 with the adjacent face of hub 20 of the clutch lever. It will therefore be seen that lever 60 acts normally to hold clutch lever 21 in its full line position shown to thus hold pulley 27 to the right with its lug 29 in driving engagement with lug 30, and that upon tilting or pivotal movement of lever 60 to the left, as viewed in Fig. 5, the outer end of lug 63 will slip off the steel insert or seat to permit movement of the clutch lever 21 to the left, as shown in Figure 5. An adjustable bolt or screw 65 is threaded through the lug 66 formed integrally with lever 60 and acts to limit pivotal movement thereof to the left, as viewed in Fig. 5, by engaging base 10 of the machine, it being understood that screw 65 is so adjusted to permit sufficient movement of lever 60 to release lever 21.

A plate or connecting element 67 is disposed between lever 50 and arm 59 and seats at one end on the lever head 53 at 68, the other end of this element being provided with the adjustable screw 69 arranged to seat on the lever part 61 and held in adjusted position by the lock nut 70. The element 67 is provided with the opening 71 through which arm 57 loosely passes, and with the fixed steel plate 72 through which arm 57 also passes, the edges 73 and 74 of plate 72 being arranged to enter into gripping relation with the respective adjacent edges of arm 57, as more clearly shown in Fig. 7, upon rocking or tilting movement of element 67 in a clockwise direction, whereby element 67 and arm 57 are locked together, upward movement of this element at this time operating to impart similar movement to arm 57 and the saw frame to which the latter is connected. From the foregoing it will be seen that when the parts are in their respective positions as shown in Fig. 8, clockwise movement of lever 50 about pin 51 will cause tilting or rocking movement of element 67 about the contact point 75 as a center until the plate edges 73 and 74 engage or grip the respective adjacent edges of arm 57, whereupon further movement of lever 50 in this direction will cause upward bodily movement of element 67 and arm 57 with which it is now interlocked, this movement causing screw 69 to be lifted slightly from its seat on the part 61, as shown in Fig. 7. The saw frame and saw 49 carried thereby will thus be raised so that the saw does not engage the bottom of the cut in the work 45. Upon counter-clockwise movement of lever 50, element 67, arm 57 interlocked therewith, and the saw frame 16 connected to arm 57, will be lowered and screw 69 again permitted to seat on part 61, further movement of lever 50 in this direction causing tilting or rocking movement of element 67 about point 75 as a center whereby the plate edges 73 and 74 are moved out of gripping relation with arm 57, as shown in Fig. 8, and the arm 57 thereby released to permit feeding movement of the saw frame toward the work under the action of spring 40. The lever 50 is provided on each side thereof with an upstanding lug 76 overhanging plate 72, as more clearly shown in Fig. 6, and suitable springs 77 held compressed between the plate and these lugs to urge the plate and element 67 downwardly at all times with respect to lever 50, whereby disengagement of the plate edges 73 and 74 with arm 57 upon seating of screw 69 on part 61, as explained, is assured. The springs 77 also act to hold the plate edges 73 and 74 in gripping relation with arm 57 when the parts are in their respective positions as shown in Fig. 7 by urging element 67 in a clockwise direction at this time about the contact point 68. The arm 59 is provided with the laterally extending lug 78 through which is threaded the adjustable bolt 79 held in adjusted position by nut 80 and arranged to engage the part 61 for the purpose hereinafter explained.

The operation of the machine will now be explained. The machine is started by moving lever 21 to the position shown in Fig. 5, lever 60 moving to the right under the action of spring 62 whereby the seat 64 is caused to catch under arm 63 to hold lever 21 in this position. In Fig. 1 the crank arm 23 is shown as being at its dead center position to the left and the saw frame about to begin its cutting stroke, at which time the roller 54 will be on the low part of cam 24 and the plate 72 in the position shown in Fig. 8 to permit free feeding movement of the saw frame 16 about the axis of shaft 22 under the action of spring 40. When crank arm 23 has rotated in the direction of the arrows to its dead center position to the right, at which time the saw frame will have completed its cutting stroke, roller 54 will ride up onto the high part 25 of cam 24 to cause oscillatory movement of lever 50 in a clockwise direction, as viewed in Figs. 7 and 8, this movement of lever 50 causing rocking movement of element 67 about point 75 as a center into gripping relation with arm 57 and consequent movement of saw 49 out of engagement with the bottom of the cut. Upon completion of the non-cutting stroke of the saw frame, at which time crank arm 23 will again be in its dead center position to the left, roller 54 will engage the low part 26 of cam 24 to cause oscillatory or tilting movement of lever 50 in a counter-clockwise direction about the axis of pin 51. The interlocked element 67 and arm 57, and the saw frame to which this arm is connected will then be lowered to permit screw 69 to seat on part 61, further downward movement of the head end 53 of lever 50 permitting of tilting or rocking movement of element 67 about point 75 as a center under the action of springs 77 out of gripping or holding relation with arm 57, the arm and saw frame then being released as shown in Fig. 8, to again permit feeding movement of the saw frame into the work under the action of spring 40. By adjusting nut 41 the pressure between saw 49 and the work will be varied.

The bolt 79 is so adjusted that when saw 49 has cut through the work, its lower end engages part 61 to cause the lever 60 to be moved to the left a slight amount, as viewed in Fig. 5, against the action of spring 62, the part 61 being thereby lowered sufficiently to prevent seating of screw 69 thereon when roller 54 engages the low part 26 of cam 24. It will therefore be seen that at this time no rocking or tilting movement of plate 72 will occur to release arm 57, and that the saw frame will therefore be held against further feeding movement. In the event that there is some slight slippage between plate 72 and arm 57 to permit further feeding movement of the saw frame under the action of spring 40, the bolt 79 will be carried down with the frame to cause further tilting movement of lever 60 to the left until lug 63 of the clutch lever slips off the seat 64 and is thus permitted to move to the left sufficiently to permit disconnection of shaft 22 from the driving pulley 27 under the action of spring 33, as explained. By adjusting screw 79 the position reached by frame 16 before lever 21 is released may be varied. It will be seen further that by adjusting screw 69 the distance through which the saw frame is raised when roller 54 passes from the low to the high part of cam 24 may be varied. When the cut has been completed, the lever 60 may be moved to the left, as view in Fig. 5, to release the clutch lever 21 and stop the machine, this action being accompanied by rocking movement of element 67 about the point 68 under the action of spring 77 to place the plate edges 73 and 74 into gripping engagement with arm 57. By gripping the handle 84, the saw frame may be readily raised to permit of movement of the work into place, the springs 77 yielding sufficiently at this time to permit of upward movement of arm 57 through plate 72. Upon release of handle 84 the frame will be held in raised position due to the interlocking engagement of element 67 with arm 57. To permit lowering of the saw frame into operating position again, element 67 may be tilted or rocked in a counter-clockwise direction, as viewed in Fig. 7, by means of the handle 81 formed integrally with element 67. The machine may be stopped by moving lever 60 to the left, as view in Fig. 5, to release lever 21.

The base 10 is provided with the opening 82 through which arm 57 freely passes upon downwardly feeding movement of frame 16 about the axis of shaft 22.

As indicated in Fig. 2, the sides of recesses 18 and lugs 19 are beveled to cause the latter to slide out of these recesses with a cam action upon movement of lever 21 from its dotted to the full line position thereof shown in Fig. 5.

A suitable gage, indicated generally in Fig. 1 by the reference numeral 83, may be provided for use in cutting from stock pieces equal in length.

While one embodiment of the invention has been shown and described, of course various changes may be made in the size, shape and arrangement of the parts without departing from the spirit of the invention or the scope of the claims.

The invention claimed is:

1. In a metal sawing machine, a saw frame, means for supporting and imparting sawing movement to said frame, a plate supported for tilting movement, an actuating arm connected to said frame and movable upwardly to raise the latter and extending loosely through said plate, means operable upon completion of the cutting stroke of said frame to tilt said plate into interlocking relation with said arm and to impart upward movement to said plate, said last-named means being operable upon completion of the non-cutting stroke of said frame to cause reverse movement of said plate and to tilt the same out of such relation with said arm, and means cooperable with said last-named means and said frame upon feeding movement of the latter to a predetermined position to prevent operation of said last-named means to tilt said plate out of interlocking relation with said arm.

2. A metal sawing machine comprising a saw frame, means for imparting sawing movement thereto, an operating lever synchronized with the sawing movements of the frame, an arm connected to the frame, a floating member operatively associated with the lever and having means to grip the arm when the floating member is rocked in one direction, and moved bodily and to disengage the arm when rocked in the opposite direction, a fulcrum with which the floating member is freely engageable and disengageable, and means for shifting the fulcrum for the floating member out of co-operative relation therewith when the saw has cut through the work.

3. A metal sawing machine comprising a shaft, clutch controlled driving mechanism for the shaft, a controlling lever governing the action of the clutch and biased to a position wherein the clutch is released, a movable stop lever engageable with said lever to hold it in position to retain the clutch engaged, a saw frame, means actuated from the shaft for imparting sawing movement to the saw frame, an arm connected to the saw frame and partaking of the movements of the same toward and away from the work, a cam operated by the shaft, an operating lever oscillated by said cam, a floating member actuated by the lever, a fulcrum for the floating member carried by the stop member, gripping means carried by the floating member and adapted to have gripping engagement with the arm when the floating member is rocked upwardly on its fulcrum and to be released from such engagement when the floating member is rocked downwardly on its fulcrum, and means partaking of the movement of the saw frame toward and away from the work and adapted to move the stop member to shift the fulcrum out of co-operative relation with the floating member when the saw has cut through the work and to further rock the stop member and disengage it from the controlling lever in the event of slippage of the gripping means after the saw has cut through the work.

In witness whereof, I hereto affix my signature.

CHARLES RASMUSSEN.